(12) United States Patent
Sato (10) Patent No.: US 7,860,892 B2
(45) Date of Patent: Dec. 28, 2010

(54) INFORMATION PROCESSING APPARATUS, HISTORY FILE GENERATION METHOD AND PROGRAM

(75) Inventor: Tomoya Sato, Kawasaki (JP)

(73) Assignee: Canon Kabushiki Kaisha (JP)

( * ) Notice: Subject to any disclaimer, the term of this patent is extended or adjusted under 35 U.S.C. 154(b) by 215 days.

(21) Appl. No.: 11/237,324

(22) Filed: Sep. 28, 2005

(65) Prior Publication Data

US 2006/0075334 A1    Apr. 6, 2006

(30) Foreign Application Priority Data

Sep. 29, 2004    (JP)    ............... 2004-284929

(51) Int. Cl.
*G06F 17/30*    (2006.01)
(52) U.S. Cl. ................ 707/796; 706/12; 706/13; 706/14
(58) Field of Classification Search ........... 707/101; 709/206; 715/501.1; 706/12–14
See application file for complete search history.

(56) References Cited

U.S. PATENT DOCUMENTS

| | | | |
|---|---|---|---|
| 6,230,189 B1 * | 5/2001 | Sato et al. ............... 709/206 |
| 6,260,043 B1 * | 7/2001 | Puri et al. ............... 707/101 |
| 6,356,920 B1 * | 3/2002 | Vandersluis ............ 715/501.1 |
| 7,320,007 B1 * | 1/2008 | Chang .................... 707/102 |

FOREIGN PATENT DOCUMENTS

| CN | 1492330 A | 4/2004 |
|---|---|---|
| JP | 62-002376 A | 1/1987 |
| JP | 08-115236 A | 5/1996 |
| JP | 2000-207254 | 7/2000 |
| JP | 2002-328817 | 11/2002 |
| JP | 2003-178285 | 6/2003 |
| JP | 2004-056166 A | 2/2004 |
| JP | 2004-145490 A | 5/2004 |

OTHER PUBLICATIONS

Search Report issued in corresponding Chinese application No. 2005101070498, mailed Nov. 2, 2007.

* cited by examiner

*Primary Examiner*—Luke S. Wassum
*Assistant Examiner*—Noosha Arjomandi
(74) *Attorney, Agent, or Firm*—Rossi, Kimms & McDowell LLP

(57) ABSTRACT

An information processing apparatus provides history information by a history file in a designated data format, in which the history file is generated by storing the contents of processing performed by the information processing apparatus, and reading and recomposing the stored history information in accordance with a received data format, if a designation of the data format for the history file is received from the user.

5 Claims, 11 Drawing Sheets

FIG. 3

| RECEPTION NUMBER | RECEPTION TIME | USER NAME | OUTPUT DOCUMENT NAME | OUTPUT RESULT |
|---|---|---|---|---|
| 0 | 2003/9/18 10:10 | tomoya | test.doc | OK |
| 1 | 2003/9/18 17:10 | administrator | report | OK |
| 2 | 2003/9/19 9:27 | tomoya | log.xls | NG |
| 3 | 2003/9/21 12:43 | guest | log.xls | OK |
| 4 | 2003/9/21 11:04 | sato | document.doc | OK |
| ... | ... | ... | ... | ... |

301 — RECEPTION NUMBER
302 — RECEPTION TIME
303 — USER NAME
304 — OUTPUT DOCUMENT NAME
305 — OUTPUT RESULT

FIG. 4

```
<?xml version="1.0" encoding="ISO-8859-1"?>
<printlog>
    #RECORD
</printlog>
```
— 401

```
<job number="#JOB_NO">
    <result>
        #RESULT
    </result>
    <name>
        #JOB_NAME
    </name>
    <user>
        #USER_NAME
    </user>
</job>
```

```xml
<?xml version="1.0" encoding="ISO-8859-1"?>
<printlog>
<job number="0">
   <result>
      OK
   </result>
   <name>
      test.doc
   </name>
   <user>
      tomoya
   </user>
</job>
<job number="1">
   <result>
      OK
   </result>
   <name>
      report
   </name>
   <user>
      administrator
   </user>
</job>
<job number="2">
   <result>
      NG
   </result>
   <name>
      log.xls
   </name>
   <user>
      tomoya
   </user>
</job>
<job number="3">
   <result>
      OK
   </result>
   <name>
      log.xls
   </name>
   <user>
      guest
   </user>
</job>
<job number="4">
   <result>
      OK
   </result>
   <name>
      document.doc
   </name>
   <user>
      sato
   </user>
</job>
</printlog>
```

RECEPTION NUMBER, USER NAME,
OUTPUT DOCUMENT NAME, OUTPUT RESULT
RECORD

FIG. 13

"#JOB_NO","#USER_NAME","#JOB_NAME","#RESULT"

FIG. 14

RECEPTION NUMBER, USER NAME, OUTPUT DOCUMENT NAME, OUTPUT RESULT
"0","tomoya","test.doc","OK"
"1","administrator","report","OK"
"2","tomoya","log.xls","NG"
"3","guest","log.xls","OK"
"4","sato","document.doc","OK"

INFORMATION PROCESSING APPARATUS, HISTORY FILE GENERATION METHOD AND PROGRAM

BACKGROUND OF THE INVENTION

1. Field of the Invention

The present invention relates to an information processing apparatus, a history file generation method and a program, and more particularly to an information processing apparatus that can provide the history information with a history file in a designated data format, a history file generation method applicable to the information processing apparatus, and a program for enabling a computer to perform the history file generation method.

2. Related Background Art

Conventionally, the image processing apparatus having a print output function or a transmitting/receiving function of image data has been well known in which its operation history (log) is stored to allow the user to acquire the history as a file, as needed.

For example, in a certain digital computing apparatus, an operation to be recorded is extracted, based on a record level indicating the operation contents executed by operation execution means in stages, and the history information of the extracted operation is recorded (e.g., refer to Japanese Patent Application Laid-Open No. 2003-178285).

Besides, various proposals for a history recording method have been conventionally made.

Also, a certain computer system can output a log file for every date using a dedicated log file generation program (e.g., refer to Japanese Patent Application Laid-Open No. 2002-328817).

Also, in a log collection rule setting process, a log file format (file format adapted to the application using a log file) can be selected from among a plurality of log file formats (e.g., refer to Japanese Patent Application Laid-Open No. 2000-207254).

However, conventionally, the format of acquiring the history file such as CSV (Comma Separated Value: data format in which the fields of record are marked off by a comma and the records are marked off by a line feed code) was defined beforehand for each apparatus.

Therefore, the user who acquires and uses the history file had to perform a process of extracting and shaping the necessary information from the acquired file again.

SUMMARY OF THE INVENTION

It is an object of the invention to provide an information processing apparatus that can provide a history file in a data format desired by the user, a history file generation method, and a program.

According to the invention, in the information processing apparatus that can provide the history information with a history file in a designated data format, the history file is generated by storing the contents of processing performed in the information processing apparatus, and reading and recomposing the stored history information in accordance with the received data format, if a designation of the data format for the history file is received from the user.

Thereby, the history file can be provided in the data format desired by the user, and is very convenient for the user.

In order to accomplish the above object, according to a first aspect of the invention, there is provided an information processing apparatus that can provide history information by means of a history file in a designated data format. The information processing apparatus comprises:

a history storage unit that stores contents of a process performed by the information processing apparatus as history information;

a designation reception unit that receives a designation of a data format for a history file from a user; and a history file generation unit that generates a history file by reading the history information stored by the history storage unit and recomposing the read history information in accordance with the data format received by the designation reception unit.

In order to accomplish the above object, according to a second aspect of the invention, there is provided a history file generation method applicable to an information processing apparatus that can provide history information by means of a history file in a designated data format. The method comprises:

a history storage step of storing contents of a process performed by the information processing apparatus as history information;

a designation reception step of receiving a designation of a data format for a history file from a user; and a history file generation step of generating a history file by reading the stored history information and recomposing the read history information in accordance with the received data format.

In order to accomplish the above object, according to a third aspect of the invention, there is provided a computer program that causes a computer to execute a history file generation method applicable to an information processing apparatus that can provide history information by means of a history file in a designated data format. The program causes the computer to execute:

a history storage step of storing contents of a process performed by the information processing apparatus as history information;

a designation reception step of receiving a designation of a data format for a history file from a user; and a history file generation step of generating a history file by reading the stored history information and recomposing the read history information in accordance with the received data format.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
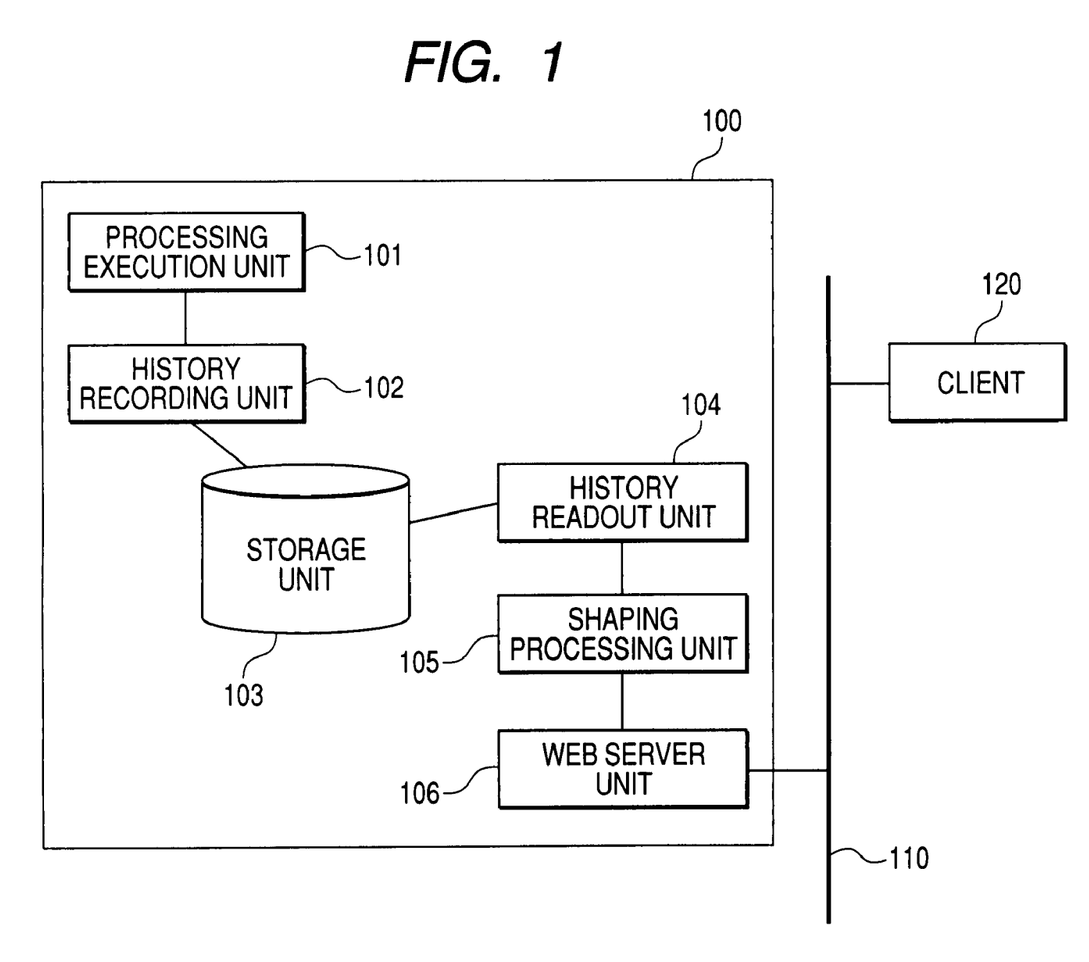
FIG. 1 is a block diagram showing the configuration of a system comprising an image processing apparatus according to one embodiment of the present invention.

FIG. 1 is a block diagram showing the configuration of a system comprising an image processing apparatus as an information processing apparatus according to one embodiment of the invention.

Reference numeral 100 designates the image processing apparatus having, as its functions, a processing execution unit 101, a history recording unit 102, a storage unit 103, a history readout unit 104, a shaping processing unit 105 and a Web server unit 106. The image processing apparatus 100 is connected to a network 110, to which a client (Web client terminal device) 120 is connected. The client 120 is composed of a central processing unit (CPU), a ROM (Read Only Memory) storing a program performed by the CPU, a RAM (Random Access Memory) used for arithmetic operation by the CPU, and an input/output device, for example.

The processing execution unit 101 performs the print output or transmission of image data. If the processing execution unit 101 performs the processing, the history recording unit 102 records the history information in the storage unit 103. The history readout unit 104 reads out the history information stored in the storage unit 103. The shaping processing unit 105 shapes the history information read out by the history readout unit 104. The Web server unit 106 makes the communication with the client 120 in accordance with an HTTP (Hypertext Transfer Protocol), and interprets a request from the client 120 to operate the shaping processing unit 105 in accordance with the request and transmit the history information to the client 120.

Though one image processing apparatus 100 and one client 120 are connected to the network 110 in FIG. 1, a plurality of image processing apparatuses or clients may be connected to the network 110.

Figure 2:
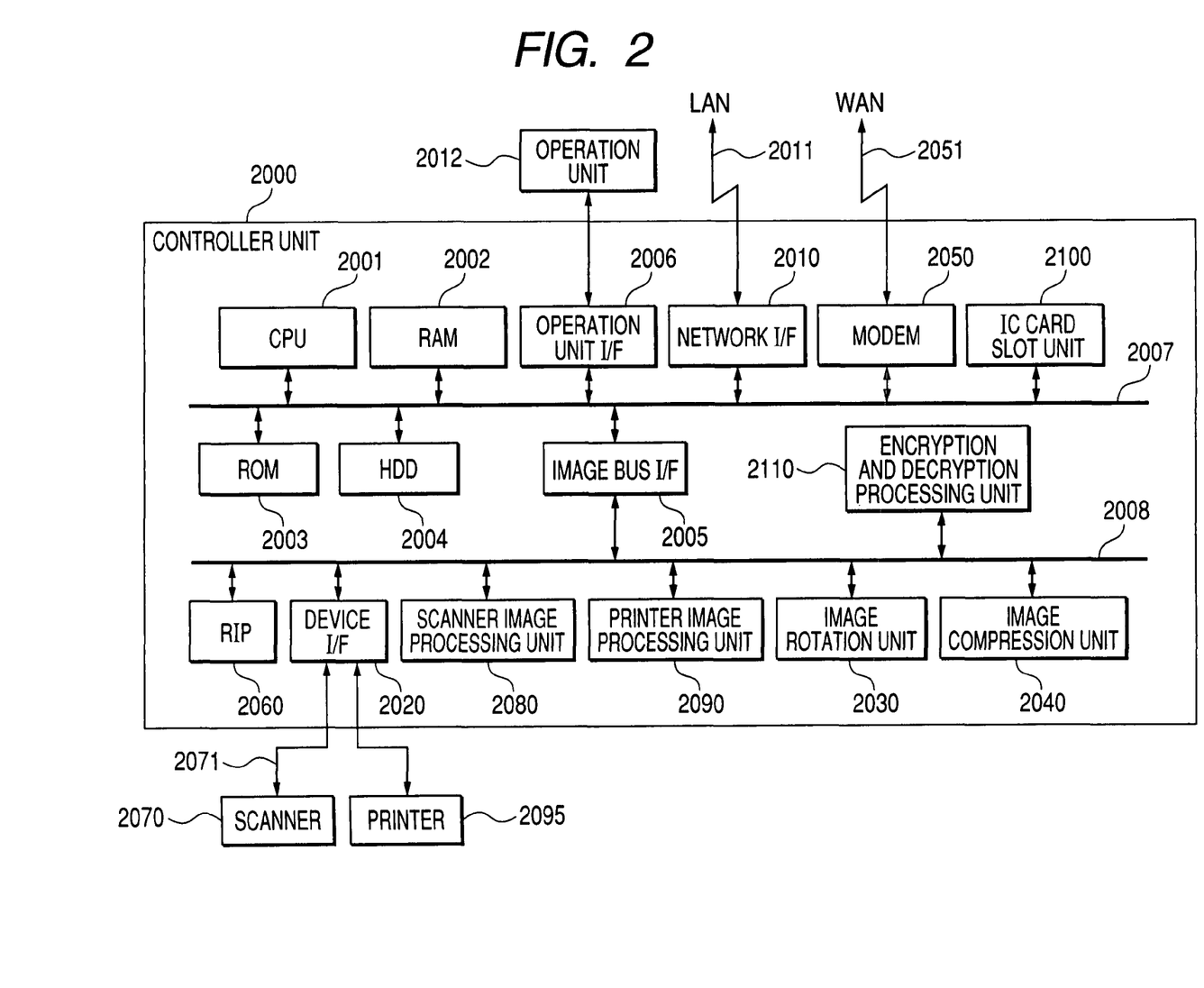
FIG. 2 is a block diagram showing the hardware configuration of the image processing apparatus as shown in FIG. 1.

FIG. 2 is a block diagram showing the hardware configuration of the image processing apparatus 100 as shown in FIG. 1.

The image processing apparatus 100 comprises a controller unit 2000, an operation unit 2012, a scanner 2070, and a printer 2095. The controller unit 2000 is connected to the scanner 2070 that is an image input device or the printer 2095 that is an image output device, and also connected to a LAN 2011 or a public line (WAN) 2051, thereby making the input/output of image information or device information.

In the controller unit 2000, a CPU 2001 is a controller for controlling the overall system. A RAM 2002 is an image memory for providing a working area to the CPU 2002 and temporarily storing the image data. A ROM 2003 is a boot ROM for storing a boot program of the system. An HDD 2004 is a hard disk drive for storing the system control software and image data. An operation unit I/F 2006 is an interface with the operation unit (UI) 2012 having a touch panel, for outputting the image data to be displayed on the operation unit 2012 to the operation unit 2012. Also, the operation unit I/F 2006 passes the information inputted into the operation unit 2012 by the system user to the CPU 2001. A network I/F 2010 connects the controller unit 2000 to the LAN 2011 to input or output the information. A MODEM 2050 connects the controller unit 2000 to the public line 2051 to input or output the information. An IC card slot unit 2100, into which the IC card media is inserted, provides the interface for transmitting or receiving the information between the IC card media and the CPU 2001. The above devices are disposed on a system bus 2007.

An image bus I/F 2005 is a bus bridge for connecting the system bus 2007 and an image bus 2008 to convert the data structure. The image bus 2008 is a bus for image that transfers the image data at high speed, consisting of a PCI bus or an IEEE 1394.

The following devices are disposed on the image bus 2008.

That is, a raster image processor (RIP) 2060 develops a PDL (Page Description Language) code into a bit map image. A device I/F 2020 connects the scanner 2070 or printer 2095 and the controller unit 2000 to make the synchronous/asynchronous conversion of image data. A scanner image processing unit 2080 corrects, processes or edits the input image data. A printer image processing unit 2090 makes the correction or resolution conversion for the print output image data to comply with the specifications of the printer 2095. An image rotation unit 2030 rotates the image data. An image compression unit 2040 performs a compression expansion process of JPEG for the multi-valued image data or JBIG, MMR or MH for the binary image data. An encryption and decryption processing unit 2110 is a hardware accelerator board for making an encryption and decryption process of data employing a key of the IC card slot unit 2100. In the IC card slot unit 2100, the key for encryption and decryption can be inputted or outputted by inputting an appropriate PIN (Personal Identifier Number) code after insertion of the IC card media.

Next, a process performed in the history recording unit 102 will be described below.

Figure 3:
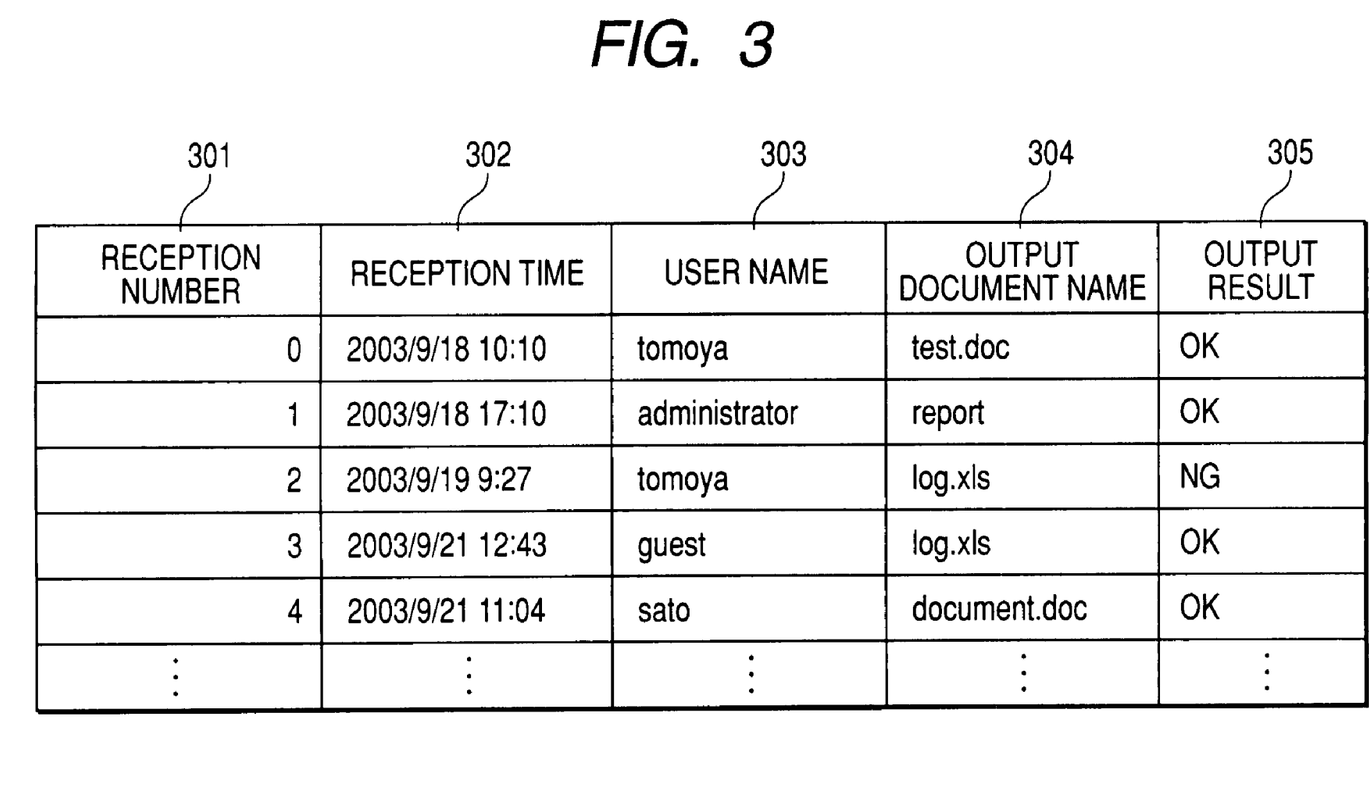
FIG. 3 shows one example of history information recorded in a storage unit by a history recording unit when a print output process is performed.

The history recording unit 102 stores the history information in accordance with an instruction from the processing execution unit 101. The contents recorded in the storage unit 103 are different for each kind of process such as print or transmission, and recorded for each process. FIG. 3 shows one example of history information recorded in the storage unit 103 by the history recording unit 102 when a print output process is performed.

The storage unit 103 stores a reception number 301, a reception time 302, a user name 303, an output document name 304, and an output result 305, every time the print output process is performed, as shown in FIG. 3. In FIG. 3, the data for each process indicated in one row is called a record.

Though the shaping processing unit 105 as shown in FIG. 1 performs the shaping process employing a template file, the template file will be described below. The template file consists of a main template file and a record template file.

The user gains access to the image processing apparatus 100 employing the client 120, and designates beforehand the contents of the template file to designate the data format of a history file desired by the user.

The main template file is a text file for designating the form of the overall history file.

The record template file is a text file for designating the form of each record within the history file, and is repeatedly applied to all the records.

Figure 4:
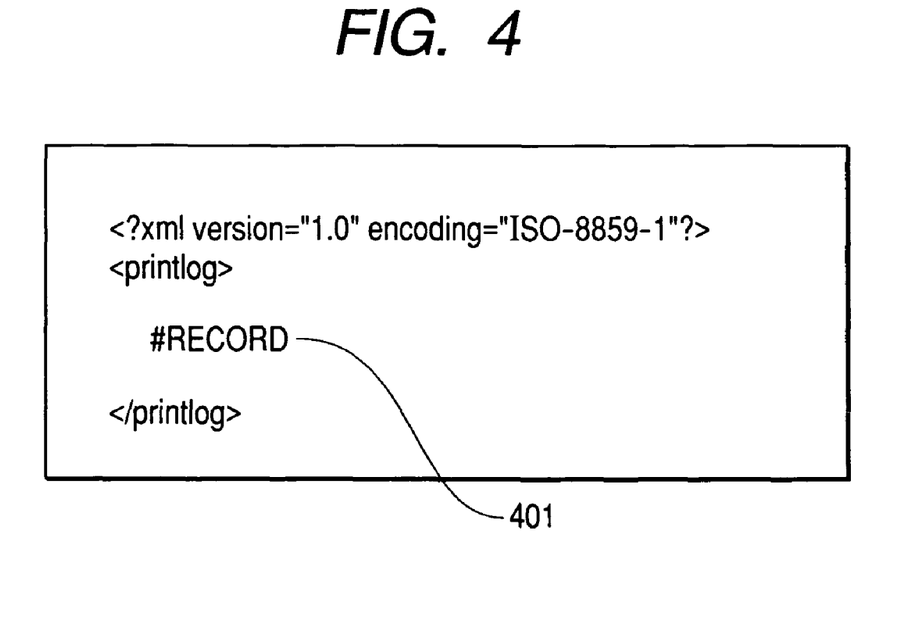
FIG. 4 shows one example of a main template file.

FIG. 4 shows an example of the main template file.

The main template file contains a predefined special character string "#RECORD" 401 for designating the reading of the record template file.

Figure 5:
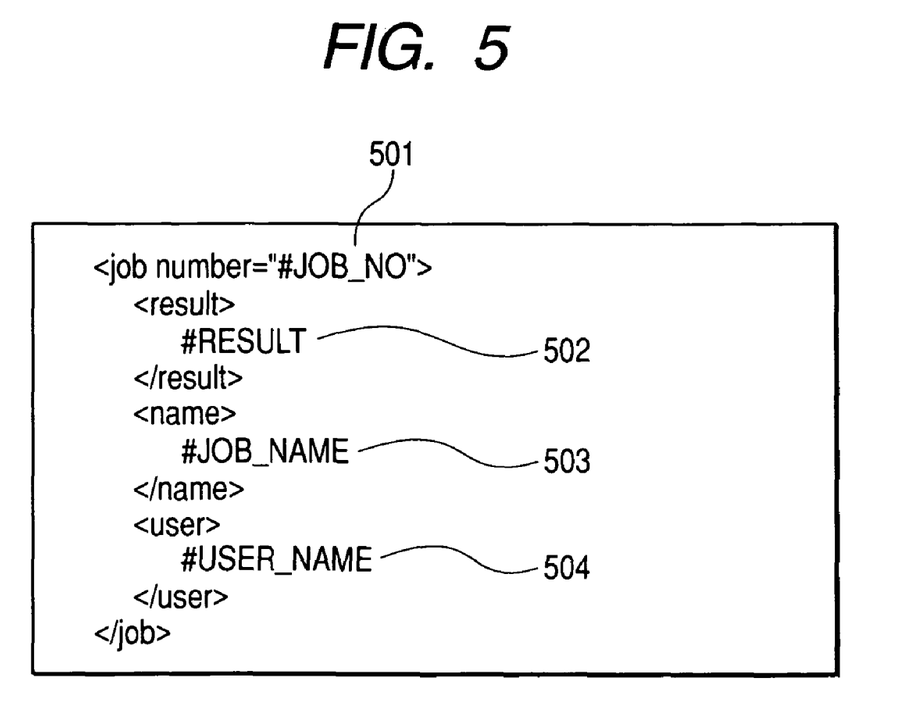
FIG. 5 shows one example of a record template file.

FIG. 5 shows an example of the record template file.

The record template file contains a predefined special replacement object character string. That is, it is indicated that a replacement object character string "#JOB_NO" 501 is replaced with the value of the reception number 301 of a corresponding record in the history information (illustrated in FIG. 3) recorded in the storage unit 103. Similarly, a replacement object character string "#RESULT" 502 is replaced with the value of the output result 305 of the corresponding record, a replacement object character string "#JOB_NAME" 503 is replaced with the value of the output document name 304 of the corresponding record, and a replacement object character string "#USER_NAME" 504 is replaced with the value of the user name 303 of the corresponding record. The correspondence relation between the replacement object character string and the replacement object value within the history information is predetermined, and held in the shaping processing unit 105.

Next, the history file shaping process performed in the shaping processing unit 105 will be described below.

Figure 6:
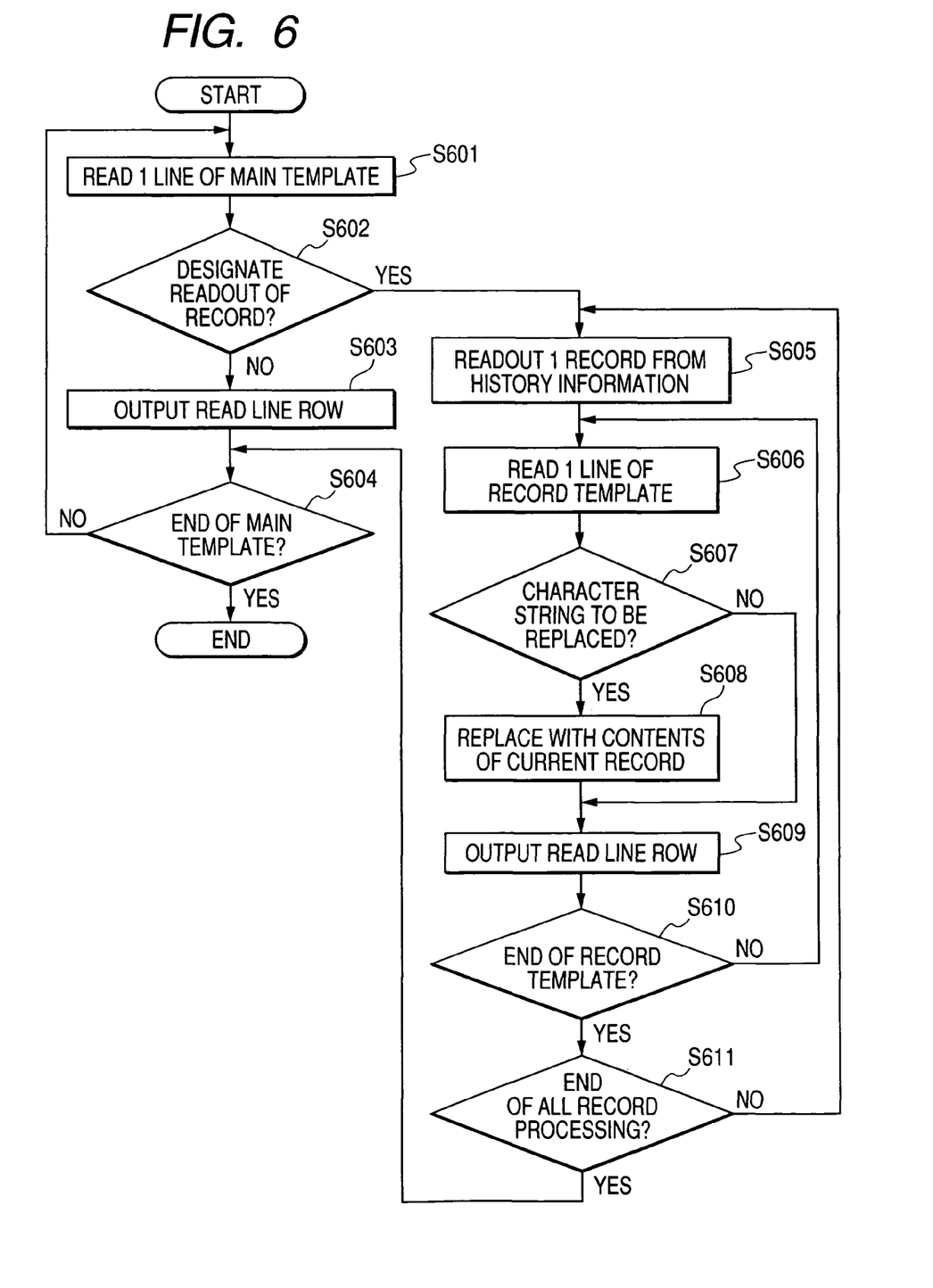
FIG. 6 is a flowchart showing a procedure of a history file shaping process performed by a shaping processing unit.

FIG. 6 is a flowchart showing a procedure of the history file shaping process performed in the shaping processing unit 105.

First of all, at step S601, one line of character string in the main template file is read.

At step S602, it is determined whether or not the character string read at step S601 is the character string (#RECORD) indicating the reading of the record template file. If the character string indicates the reading of the record template file, the procedure goes to step S605, or if not, the procedure goes to step S603.

At step S603, the character string read at step S601 is directly outputted as the character string to make up the history file. At step S604, it is determined whether or not all the lines of the main template file have been read. If all the lines have bee read, the history file shaping process is ended. If any line remains, the procedure returns to step S601 to process the next line.

At step S605, one record of the history information (illustrated in FIG. 3) recorded in the storage unit 103 is read. At step S606, one line of character string in the record template file is read.

At step S607, it is determined whether or not the character string to be replaced is contained in the character string read at step S606. If the character string to be replaced is contained, the procedure goes to step S608, or if the character string to be replaced is not contained, the procedure goes to step S609.

At step S608, the value corresponding to the character string to be replaced is read out from one record read at step S605 and replaces the character string to be replaced.

At step S609, the value replaced at step 5608 is outputted as the character string to make up the history file, when step S609 is performed after execution of step S608, while the character string read at step S606 is directly outputted as the character string to make up the history file, when step S609 is performed without execution of step S608.

At step S610, it is determined whether or not all the lines of the record template file have been read. If all the lines have not been read yet, the procedure gets back to step S606 to read the next line of the record template file. On the other hand, if all the lines have been read, the procedure goes to step S611, where it is determined whether or not all the records have been read out from the history information recorded in the storage unit 103. If all the records have bee read out, the procedure goes to step S604. If all the records have not been read yet, the procedure gets back to step S605 to read the next record from the history information and repeat the processing.

Figure 7:
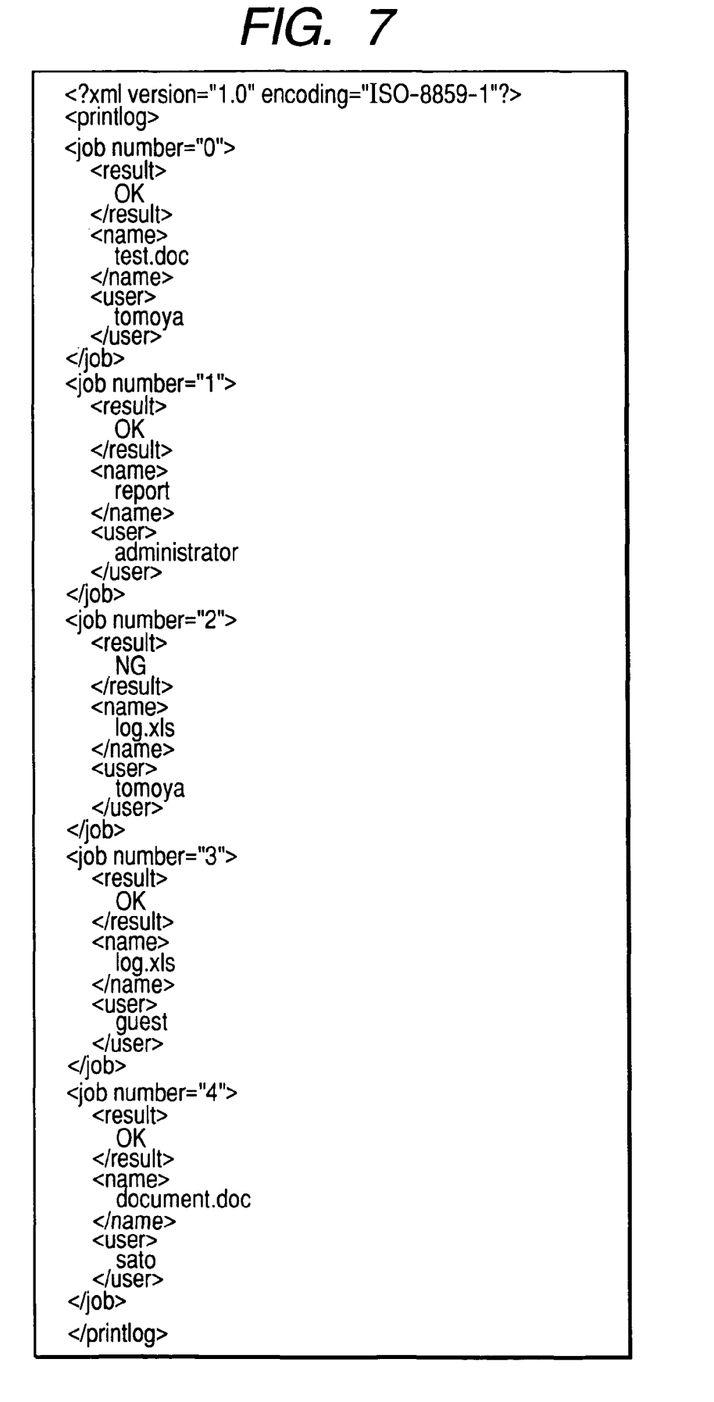
FIG. 7 shows a history file in an XML format that is generated when the history file shaping process is performed employing the history information as shown in FIG. 3, the main template file as shown in FIG. 4, and the record template file as shown in FIG. 5.

When the above history file shaping process is performed employing the history information as shown in FIG. 3, the main template file as shown in FIG. 4 and the record template file as shown in FIG. 5, a history file in an XML format as shown in FIG. 7 is generated.

A method for allowing the user to designate the template file to be used for the generation (shaping) of the history file will be described below.

In this embodiment, the template file is designated employing a Web browser. The image processing apparatus 100, which has a Web server unit 106 as shown in FIG. 1, makes the HTTP communication with the client 120 via the Web server 106 and performs the processing in accordance with a request from the client 120. In recent years, each type of apparatus has a Web server function to deal with a processing request from the Web client. The detailed explanation of the Web server function is omitted here because the Web server function is well known.

Figure 8:
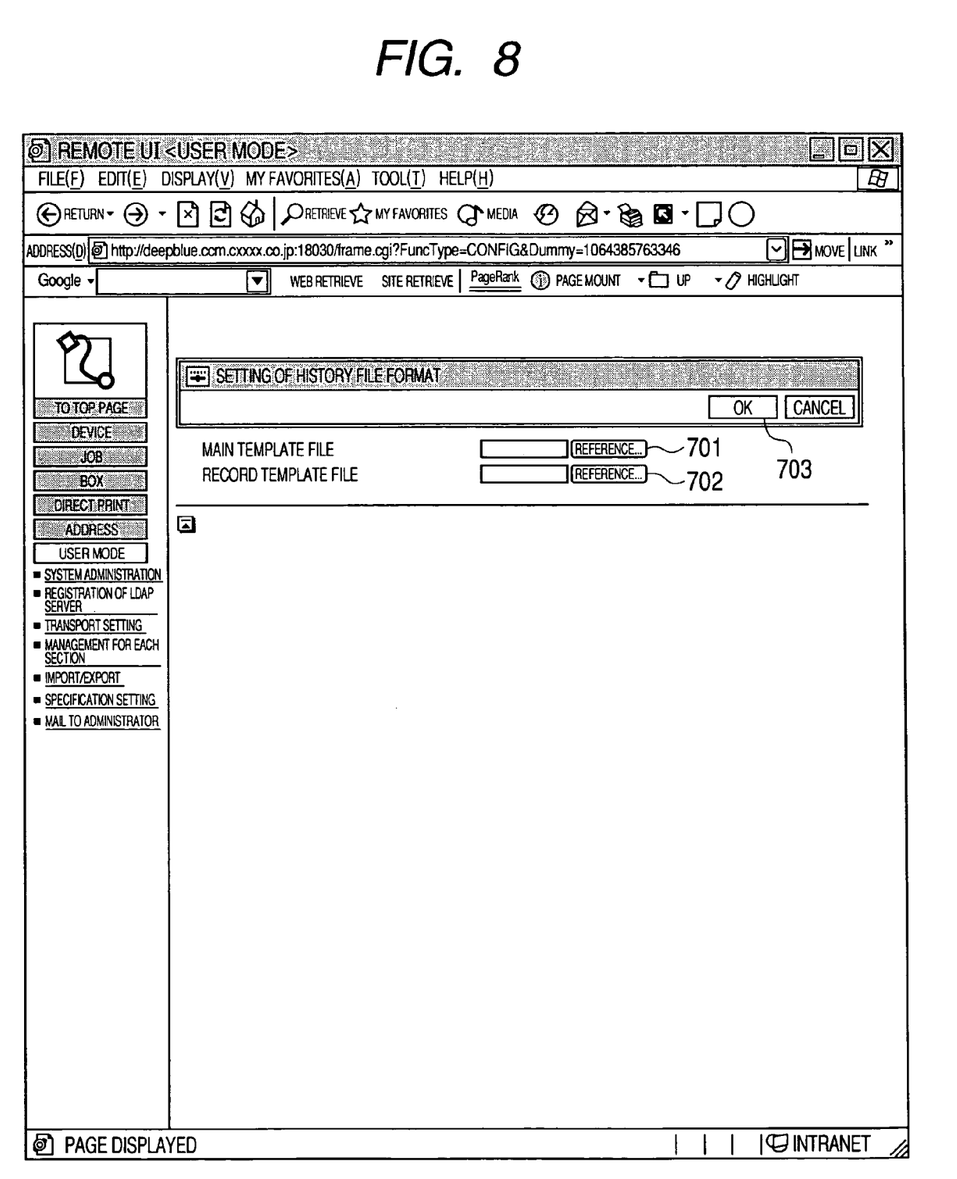
FIG. 8 shows a screen example that is displayed on the client when the user gains access to the image processing apparatus employing a general Web browser on the client and calls a template file designation screen.

FIG. 8 shows a screen example displayed on the client 120 when the user gains access to the image processing apparatus 100 employing the general Web browser on the client 120 and calls a template file designation screen.

Figure 9:
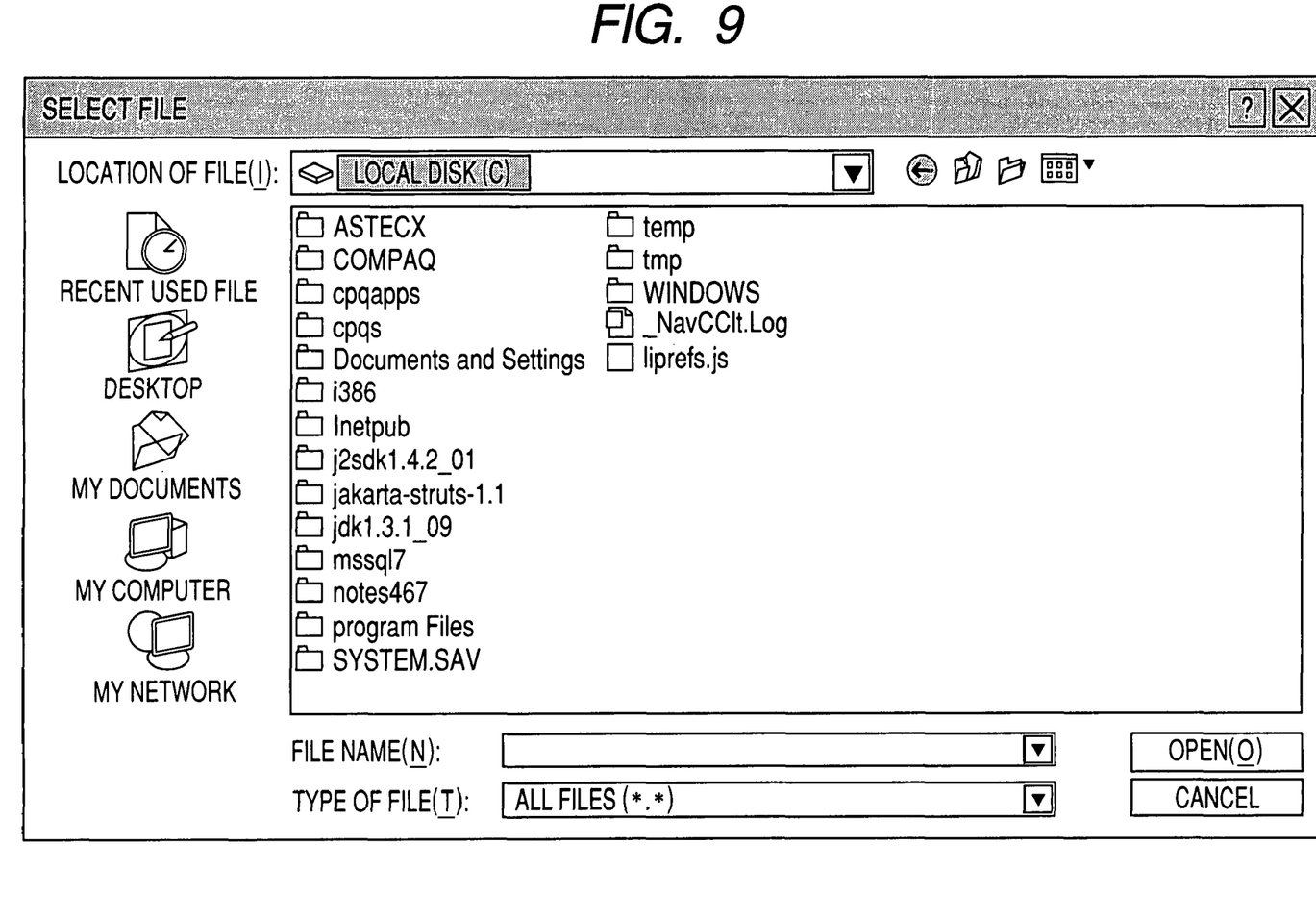
FIG. 9 shows a file selection screen displayed on the client when the user depresses a "reference" button on the template file designation screen as shown in FIG. 8.

If a "reference" button 701 or a "reference" button 702 is depressed on this screen, a file selection screen as shown in FIG. 9 is displayed.

The user designates the main template file and the record template file that are generated in advance by the text editor, seeing this file selection screen. Thereafter, if the user depresses an OK button 703 on the template file designation screen of FIG. 8, the main template file and the record template file are transmitted to the image processing apparatus 100. The image processing apparatus 100 stores the received template files. In this way, the template files transmitted from the client 120 are employed for the history file shaping process.

The image processing apparatus 100 has the default main template file and the default record template file. When there is no designation of the template files from the client 120, the default template files are employed.

Next, a user operation when the client 120 acquires the generated (shaped) history file from the image processing apparatus 100 will be described below. The client 120 performs an acquisition process of the history file employing the Web browser.

Figure 10:
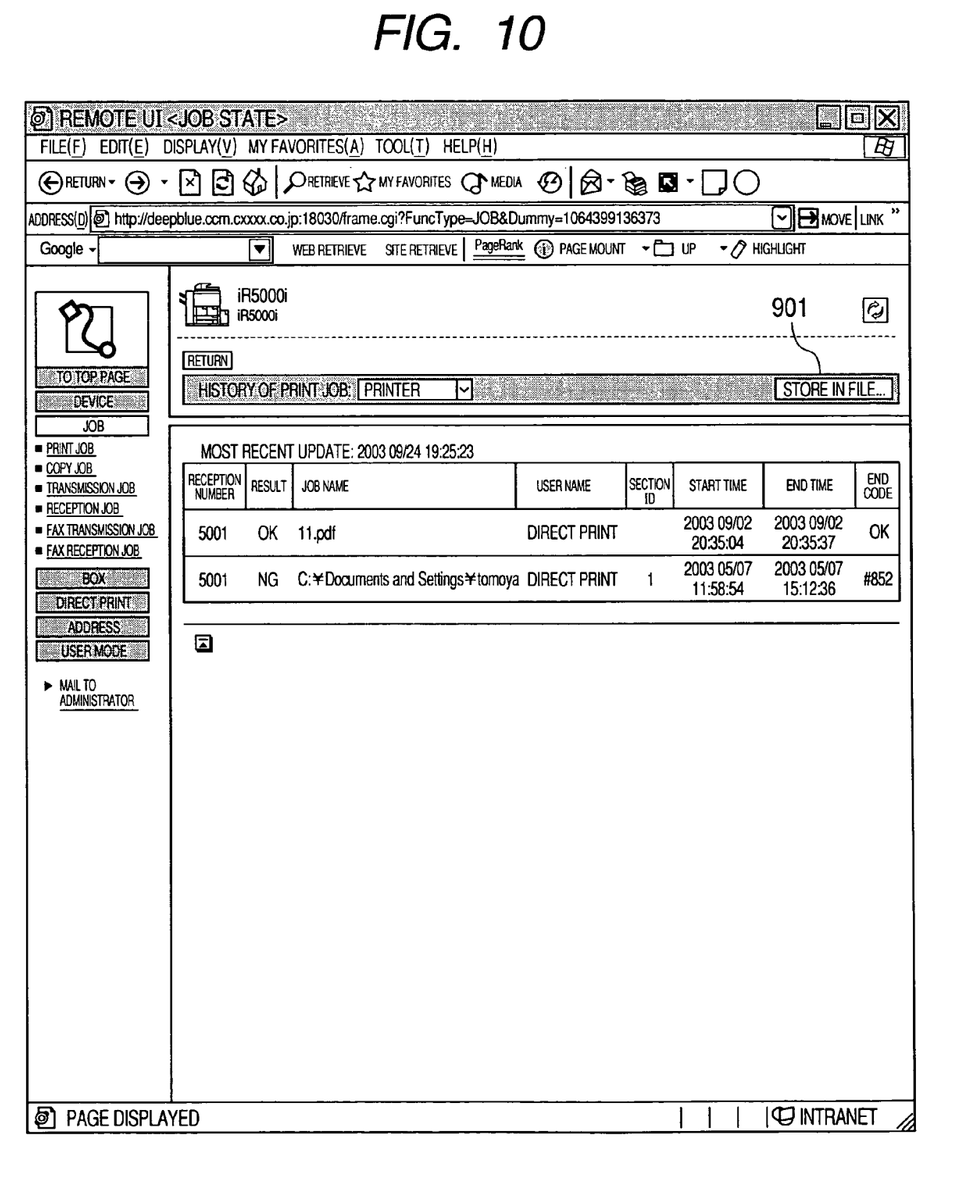
FIG. 10 shows a screen example that is displayed on the client when the user gains access to the image processing apparatus employing the general Web browser on the client and calls a history file display screen.

FIG. 10 shows a screen example displayed on the client 120 when the user gains access to the image processing apparatus 100 employing the general Web browser on the client 120 and calls a history file display screen.

If the user gains access to the image processing apparatus 100 employing the general Web browser on the client 120 and calls the history file display screen, a history file acquisition request is transmitted in HTTP from the client 120 to the image processing apparatus 100. Upon receiving this history file acquisition request, the image processing apparatus 100 reads out the history file for which the shaping process is performed by the shaping processing unit 105 and transmits it to the client 120. Thereby, a history file display screen as shown in FIG. 10 is displayed on the client 120.

Figure 11:
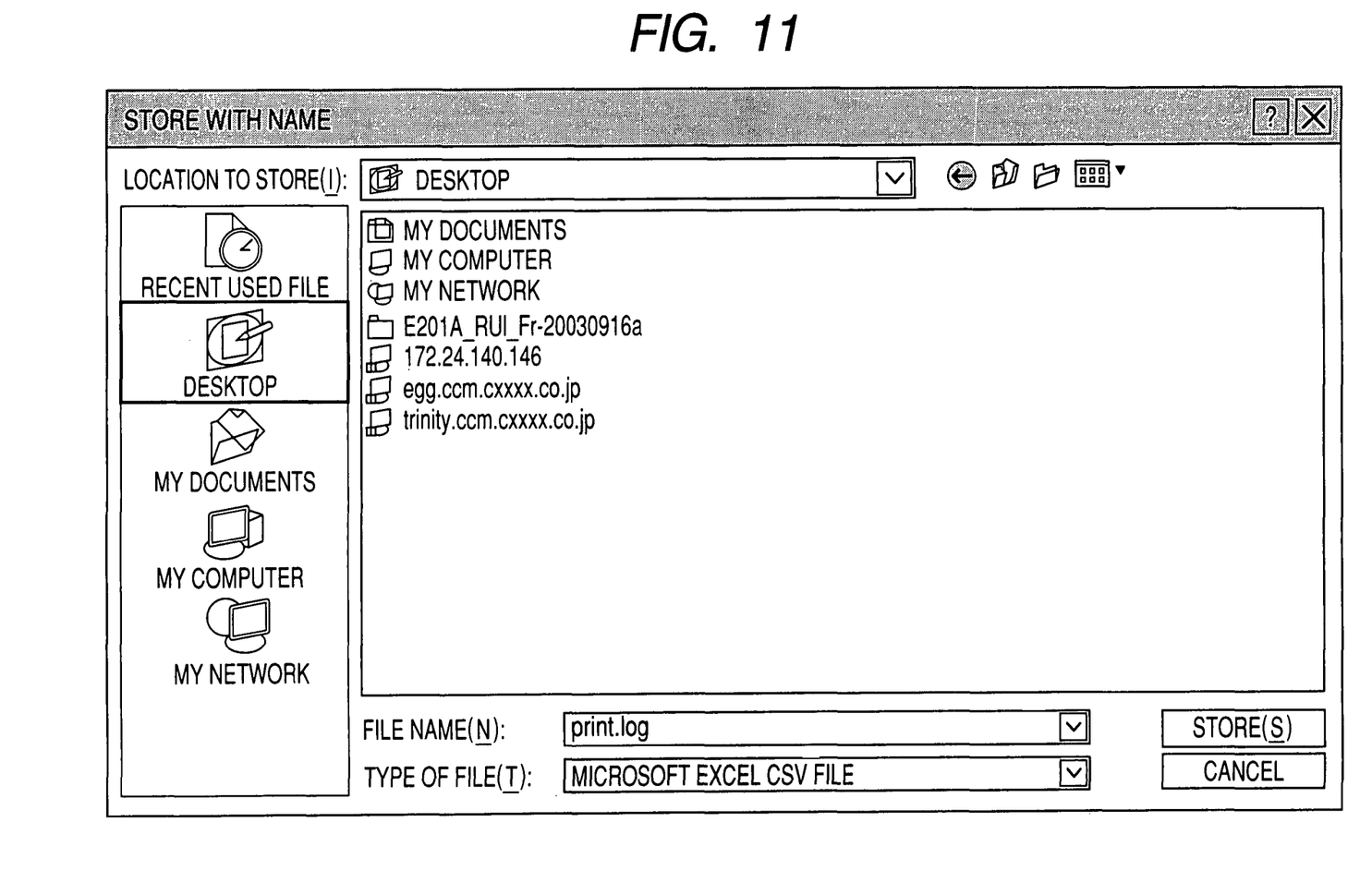
FIG. 11 shows a screen that is displayed on the client when the user depresses a "store in file" button 901 on the history file display screen as shown in FIG. 10.

If a "store in file" button 901 is depressed on this history file display screen by the user for the client 120, a screen for designating the location to store the history file is displayed on the client 120, as shown in FIG. 11. Employing this screen, the history file can be stored on the client 120.

Though the history file in the XML format as shown in FIG. 7 is generated when the history file shaping process as shown in FIG. 6 is performed employing the history information as shown in FIG. 3, the main template file as shown in FIG. 4, and the record template file as shown in FIG. 5, the history file in another format may be generated as follows.

Figure 12:
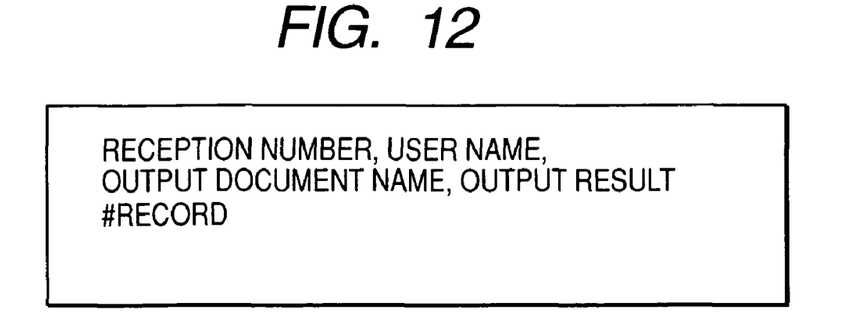
FIG. 12 shows another example of the main template file.
Figure 13:
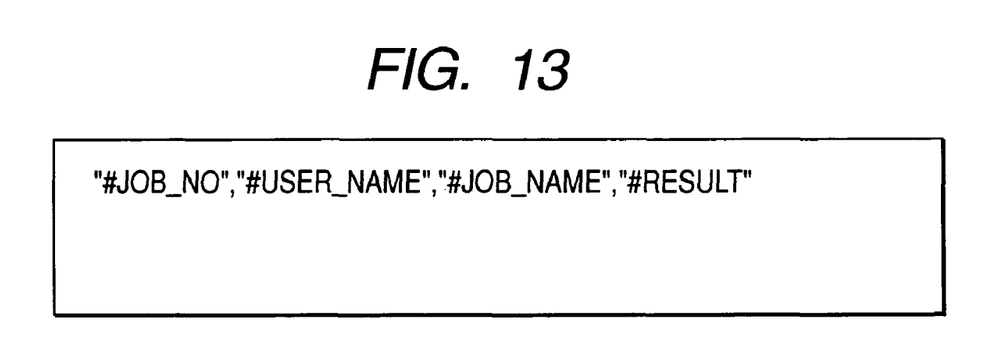
FIG. 13 shows another example of the record template file.
Figure 14:
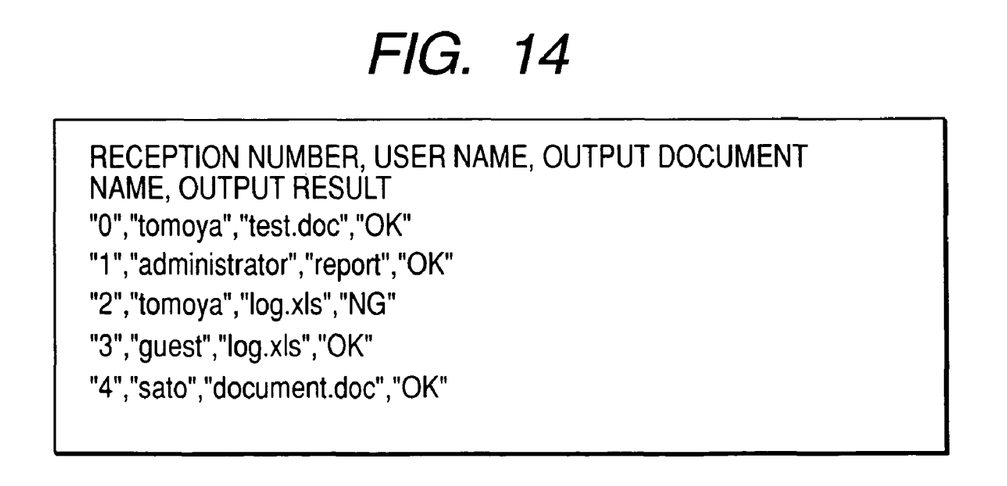
FIG. 14 shows a history file in a CSV format that is generated when the history file shaping process is performed employing the history information as shown in FIG. 3, the main template file as shown in FIG. 12, and the record template file as shown in FIG. 13.

That is, when the main template file is set as shown in FIG. 12, and the record template file is set as shown in FIG. 13, and the history file shaping process as shown in FIG. 6 is performed employing the history information as shown in FIG. 3, the history file as shown in FIG. 14 is generated. This history file is in a CSV format.

In this way, the history file may be generated in any format such as XML format or CSV format in accordance with the setup contents of the main template file and the record template file.

Though the image processing apparatus 100 transmits the history file to the client 120 via the Web browser upon a history file acquisition request from the client 120 in the above embodiment, the image processing apparatus 100 may transmit the history file to an electronic mail address set beforehand.

Other Embodiments

The object of the invention may be achieved by supplying a storage medium recording a program code of the software to implement the functions of the above embodiment to a system or apparatus, in which a computer (or CPU, MPU or the like) in the system or apparatus reads and executes the program code stored in the storage medium.

In this case, the program code itself read from the storage medium implements a new function of the invention, and the storage medium storing the program code and the program constitute the invention.

Also, the storage medium for supplying the program code maybe a flexible disk, a hard disk, an optical disk, an optical magnetic disk, CD-ROM, CD-R, CD-RW, DVD-ROM, DVD-RAM, DVD-RW, DVD+RW, a magnetic tape, a nonvolatile memory card, or ROM. Or the program may be downloaded or supplied from another computer or database connected to the Internet, a commercial network, or a local area network.

Also, the functions of the embodiment are implemented by executing the program code read out by the computer, but an OS (Operating System) operating on the computer may perform a part or all of the actual process according to the instructions of the program code to implement the functions of the embodiment.

Moreover, after the program code read out from the storage medium is written into a memory provided for a function extension board inserted into the computer or a function extension unit connected to the computer, the CPU provided for the function extension board or function extension unit may perform a part or all of the actual process according to the instructions of the program to implement the functions of the embodiment.

This application claims priority from Japanese Patent Application No. 2004-284929 filed Sep. 29, 2004, which is hereby incorporated by reference herein.

What is claimed is:

1. A log providing apparatus comprising:
a processor; a memory;
a history information reception unit configured to receive history information on a print or communication process for image data;
a WEB server unit configured to receive, from an external information processing apparatus, designation of a template which comprises a main template for designating a format of overall history information and a record template for designating a format of a record within the history information; and
a shaping unit configured to shape the history information received by the history information reception unit based on the template of which designation is received by the WEB server unit, and output the shaped history information to the WEB server unit,
wherein the WEB server unit is configured to communicate with the external information processing apparatus via a network in HTTP (Hypertext Transfer Protocol) and provide the external information processing apparatus with the history information shaped and output by the shaping unit,
wherein the WEB server unit is configured to provide a user interface and cause a WEB browser of the external information processing apparatus to display the user interface such that a user of the external information processing apparatus selects the template from among a plurality of templates stored in the external information processing apparatus,
wherein the shaping unit is configured to shape the history information either in XML (Extensible Markup Language) format or in CSV (Comma Separated Value) format based on the template selected on the user interface by the user from among the plurality of templates,
wherein the shaping unit is configured to shape the history information based on a default template provided in the log providing apparatus, if no template is selected by the user, and
wherein the history information shows a job history in the print process or in the communication process, and the history information comprises at least one of a reception number, a reception time, a user name, an output document name, and an output result of a print job.

2. The log providing apparatus according to claim 1, wherein the history information reception unit receives the history information from an image processing unit that executes the print process or the communication process.

3. A method of providing a log in a log providing apparatus having a history information reception unit, a WEB server unit, and a shaping unit, the method comprising:

a history information reception step of receiving, using the history information reception unit, history information on a print or communication process for image data;

a WEB server reception step of receiving, using the WEB server unit, designation of a template from an external information processing apparatus, the template comprising a main template for designating a format of overall history information and a record template for designating a format of a record within the history information; and a shaping step of shaping, using the shaping unit, the history information received in the history information reception step based on the template of which designation is received in the WEB server reception step, and outputting the shaped history information to the WEB server unit, wherein the WEB server reception step communicates with the external information processing apparatus via a network in HTTP (Hypertext Transfer Protocol) and provides the external information processing apparatus with the history information shaped and output in the shaping step, wherein the WEB server reception step provides a user interface and causes a WEB browser of the external information processing apparatus to display the user interface such that a user of the external information processing apparatus selects the template from among a plurality of templates stored in the external information processing apparatus, wherein the shaping step shapes the history information either in XML (Extensible Markup Language) format or in CSV (Comma Separated Value) format based on the template selected on the user interface by the user from among the plurality of templates, wherein the shaping step shapes the history information based on a default template provided in the log providing apparatus, if no template is selected by the user, and wherein the history information shows a job history in the print process or in the communication process, and the history information comprises at least one of a reception number, a reception time, a user name, an output document name, and an output result of a print job.

4. The method according to claim 3, wherein the history information reception step receives the history information from an image processing unit that executes the print process or the communication process.

5. A non-transitory computer-readable storage medium storing a computer program executable by a log providing apparatus to implement a method of providing a log, the method comprising:

a history information reception step of receiving history information on a print or communication process for image data;

a WEB server reception step of receiving, using a WEB server unit of the log providing apparatus, designation of a template from an external information processing apparatus, the template comprising a main template for designating a format of overall history information and a record template for designating a format of a record within the history information; and a shaping step of shaping the history information received in the history information reception step based on the template of which designation is received in the WEB server reception step, and outputting the shaped history information to the WEB server unit, wherein the WEB server reception step communicates with the external information processing apparatus via a network in HTTP (Hypertext Transfer Protocol) and provides the external information processing apparatus with the history information shaped and output in the shaping step, wherein the WEB server reception step provides a user interface and causes a WEB browser of the external information processing apparatus to display the user interface such that a user of the external information processing apparatus selects the template from among a plurality of templates stored in the external information processing apparatus, wherein the shaping step shapes the history information either in XML (Extensible Markup Language) format or in CSV (Comma Separated Value) format based on the template selected on the user interface by the user from among the plurality of templates, wherein the shaping step shapes the history information based on a default template provided in the log providing apparatus, if no template is selected by the user, and wherein the history information shows a job history in the print process or in the communication process, and the history information comprises at least one of a reception number, a reception time, a user name, an output document name, and an output result of a print job.

* * * * *